US011343760B2

(12) United States Patent
Staub

(10) Patent No.: US 11,343,760 B2
(45) Date of Patent: May 24, 2022

(54) SYSTEM, METHOD, AND DEVICE FOR PROVIDING LOCAL ELECTRONIC SERVICING

(71) Applicant: Caterpillar Inc., Peoria, IL (US)

(72) Inventor: Michael D. Staub, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/901,801

(22) Filed: Jun. 15, 2020

(65) Prior Publication Data

US 2021/0392573 A1 Dec. 16, 2021

(51) Int. Cl.

| H04W 4/00 | (2018.01) |
| H04W 48/18 | (2009.01) |
| H04M 1/72415 | (2021.01) |
| G07C 5/00 | (2006.01) |
| H04L 67/025 | (2022.01) |
| H04W 12/06 | (2021.01) |
| H04W 36/14 | (2009.01) |
| H04W 88/06 | (2009.01) |

(52) U.S. Cl.
CPC ............ *H04W 48/18* (2013.01); *G07C 5/008* (2013.01); *H04L 67/025* (2013.01); *H04M 1/72415* (2021.01); *H04W 12/06* (2013.01); *H04W 36/14* (2013.01); *H04W 88/06* (2013.01)

(58) Field of Classification Search
CPC ..... H04W 48/18; H04W 12/06; H04W 36/14; H04W 88/06; H04M 1/72415; G07C 5/008; H04L 67/025
USPC ........................................................ 370/328
See application file for complete search history.

(56) References Cited

U.S. PATENT DOCUMENTS

| 8,832,825 B2 | 9/2014 | Cicala |
| 8,996,232 B2 | 3/2015 | Dwan et al. |
| 9,299,247 B2 | 3/2016 | O'Neal et al. |
| 9,538,374 B2 | 1/2017 | Kaufmann et al. |
| 10,075,576 B1 | 9/2018 | Rule et al. |
| 10,300,924 B2 | 5/2019 | Phillips |
| 2007/0064714 A1 | 3/2007 | Bi et al. |
| 2014/0213238 A1 | 7/2014 | Giraud |
| 2016/0209060 A1* | 7/2016 | Castillo ............... H04L 12/2825 |
| 2017/0097881 A1 | 4/2017 | Hodel et al. |
| 2018/0024725 A1 | 1/2018 | Penilla |
| 2019/0318549 A1 | 10/2019 | Zeira |

OTHER PUBLICATIONS

Written Opinion and International Search Report for Int'l. Patent Appln. No PCT/US2021/035575, dated Sep. 14, 2021 (13 pgs).

\* cited by examiner

*Primary Examiner* — Huy C Ho
(74) *Attorney, Agent, or Firm* — Xsensus LLC

(57) ABSTRACT

A system, method, and device for providing local electronic servicing of a machine can comprise providing, to a mobile device, access to a network manager of the machine via a pairing and connection process between the network manager and the mobile device over a network; enabling, from a back office system, local electronic access functionality, such as functionality with elevated privileges, on the mobile device upon successful pairing and connection between the network manager and the mobile device; and with the mobile device and the network manager paired and connected, electronically accessing data of the machine using the mobile device.

20 Claims, 4 Drawing Sheets

SYSTEM, METHOD, AND DEVICE FOR PROVIDING LOCAL ELECTRONIC SERVICING

TECHNICAL FIELD

The present disclosure relates to providing local servicing, and more particularly to providing local servicing functionality to a mobile device for local service of machines.

BACKGROUND

Conventionally, a technician with an electronic servicing tool located next to a machine may not be recognized as being close enough to the machine to perform local servicing tasks (e.g., troubleshooting, diagnostics, etc.) at the machine without a wired connection. Hence, without a wired connection the technician's electronic servicing tool may not have access to some or all local servicing capabilities. Additionally, even with a wired connection, the technician may need to follow numerous steps just to reach a point to begin servicing the machine via the electronic servicing tool.

U.S. Pat. No. 8,996,232 ("the '232 patent") describes wireless vehicle servicing whereby diagnostic information may be exchanged between a client terminal and a vehicle computing system (VCS) of a vehicle for diagnosing one or more vehicle concerns. According to the '232 patent, servicing software may be stored on the client terminal, and the servicing software of the client terminal may transmit to the VCS servicing operation information as servicing data packet(s) over a wireless cloud.

SUMMARY OF THE DISCLOSURE

In one aspect, the present disclosure implements a method comprising: providing, to a mobile troubleshooting device, access to a network manager of a machine via a pairing process between the network manager and the mobile troubleshooting device over a personal area network; enabling, from a back office system, local troubleshooting functionality on the mobile troubleshooting device upon successful pairing and connection between the network manager and the mobile troubleshooting device over the personal area network; and with the mobile troubleshooting device and the network manager paired and connected, performing local troubleshooting operations responsive to operator inputs at the mobile troubleshooting device.

In another aspect, the present disclosure implements or provides a non-transitory computer-readable storage medium storing computer-readable instructions that, when executed by one or more computers, cause the one or more computers to perform a method. The method can comprise providing access to a network manager on or in a machine, for a mobile device having at least one of the one or more computers, via a pairing and connection process between the network manager and the mobile device over a short-wavelength, UHF radio wave wireless network; and providing local troubleshooting functionality at the mobile device to perform local troubleshooting operations upon the mobile device having access to the network manager. The local troubleshooting functionality for the mobile device can be defined according to rights granted to a subscriber authorized to access the network manager.

In yet another aspect a system for locally troubleshooting a work machine can be provided or implemented. The system can comprise: a first communication entity of the working machine, the first communication entity including a network manager; a back office system remote from the working machine; a mobile device hosting a thin client application to troubleshoot the working machine locally upon gaining access to the network manager; a first communication network accessible by the back office system and the first communication entity for the first communication entity to communicate with the back office system; a second communication network accessible by the mobile device and the network manager for the mobile device to gain access to the network manager; and a third communication network accessible by the mobile device and the back office system for the mobile device and the back office system to communicate with each other. The second communication network can be a personal area network, and the thin client application gains access to the network manager only when the mobile device is local to the network manager and within a transmission distance of the personal area network. The mobile device and the network manager can communicate troubleshooting data with each other through the back office system via the first communication network and the third communication network when the thin client application has access to the network manager via the second communication network.

Other features and aspects of this disclosure will be apparent from the following description and the accompanying drawings.

DETAILED DESCRIPTION

The present disclosure relates to providing local servicing, and more particularly to providing local servicing functionality to a mobile device for local servicing of (e.g., diagnostics, updating, troubleshooting) a machine.

Figure 1:
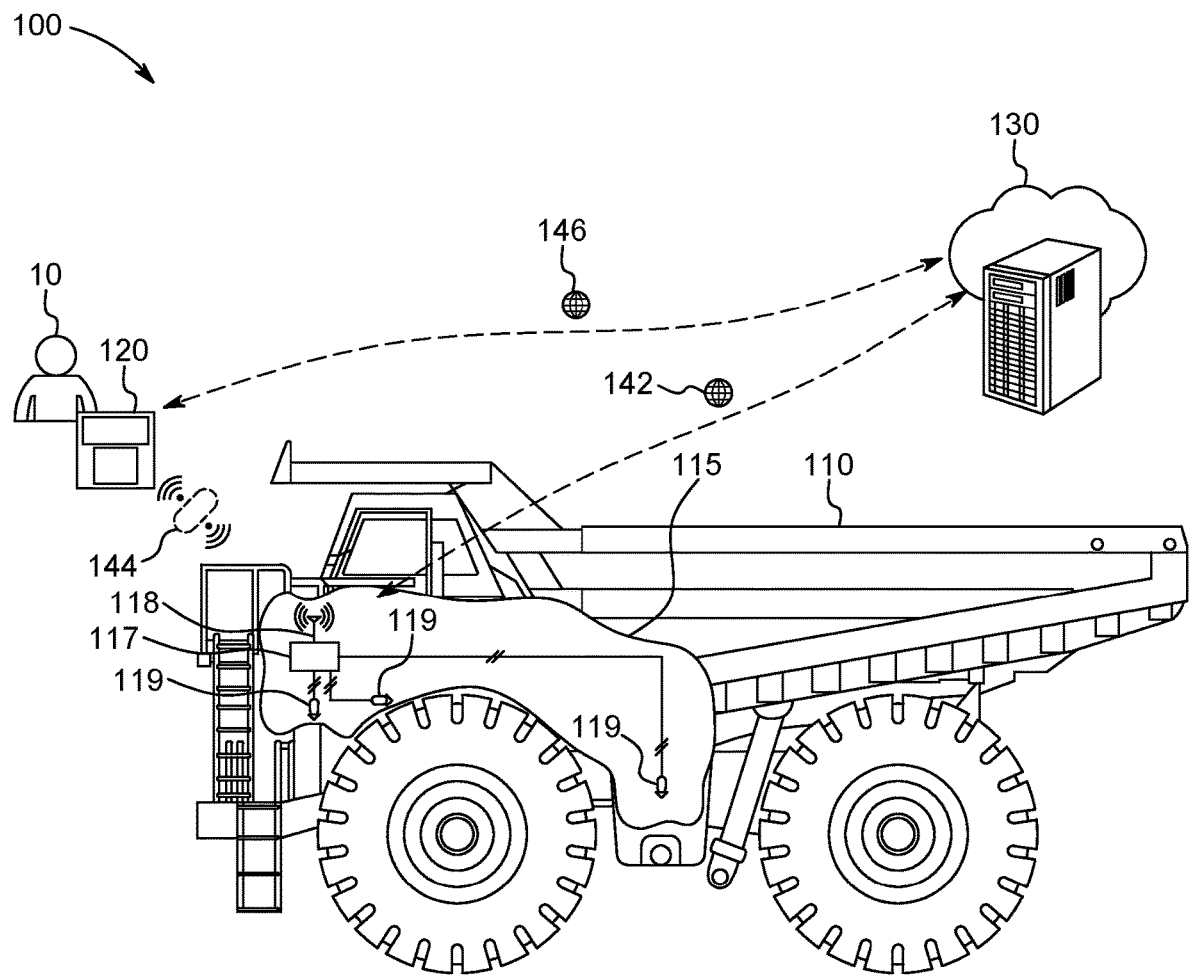
FIG. 1 illustrates an exemplary system according to one or more embodiments of the disclosed subject matter.
Figure 2:
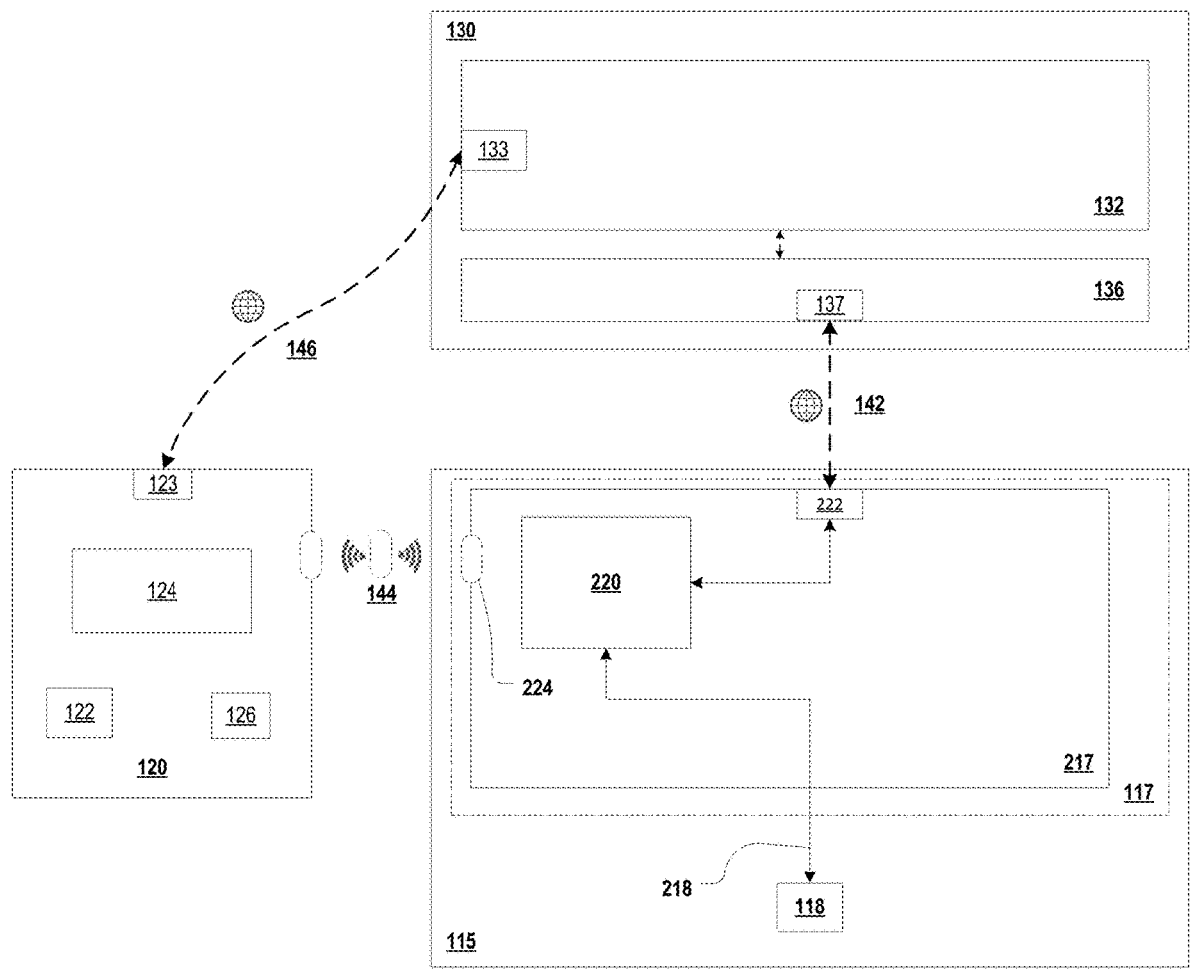
FIG. 2 is a block diagram of a system according to one or more embodiments of the disclosed subject matter.

FIG. 1 and FIG. 2 illustrate an exemplary system 100 according to one or more embodiments of the disclosed subject matter. System 100 may include one or more components that perform individual tasks that contribute to a machine environment task, such as mining, construction, transportation, agriculture, manufacturing, oil and gas, or any other type of task associated with other types of industries. For example, system 100 may include a machine 110 (or multiple machines of same or different type).

Machines according to embodiments of the disclosed subject matter may be fixed or mobile machines configured to perform operation associated with an environment of the system 100. Thus, machine, as the term is used herein, can refer to a fixed or mobile machine that performs some type of operation associated with a particular industry, such as mining, construction, farming, etc. and operates between or within project environments (e.g., construction site, mine site, power plants, etc.). Furthermore, the term machine may be used to refer to any remote asset operating within or associated with the system 100. A non-limiting example of a fixed machine includes an engine system operating in a plant, a material conveyer, or an off-shore environment (e.g., an off-shore drilling platform). Non-limiting examples of mobile machines include construction machines, such as trucks, cranes, earth moving vehicles, mining vehicles, backhoes, or any type of movable machine that operates in a work environment. For instance, in FIG. 1 the machine 110 is a haul truck, though embodiments of the disclosed subject matter are not so limited. Machines according to embodiments of the disclosed subject matter may be driven by a combustion engine or an electric motor, as non-limiting examples.

In addition to machine 110, the system 100 can also include a mobile device 120 and a back office system 130. The mobile device 120, when used at a worksite to troubleshoot the machine 110, for instance, may be considered local to the machine 110. The back office system 130 may be considered remote from the mobile device 120, for instance, when the mobile device 120 is local to the machine 110.

Local, as used herein, can mean that the mobile device 120 and the machine 110 are within a specific limited wireless communication range of each other based on a specific wireless communication protocol, wireless communication network, and wireless communication circuitry of the mobile device 120 and the machine 110. According to embodiments of the disclosed subject matter, such wireless communication can be by way of a personal area network (PAN). Personal area network, as the term is used herein, can refer to any close range (e.g., 1 m, 10 m, etc.) wireless communication protocol that enables secure communications between or among one or more PAN-approved and compatible devices, such as the machine 110 and the mobile device 120. According to one or more embodiments, the PAN may be in the form of a wireless communication network that uses short-wavelength UHF radio waves from 2.400 GHz to 2.485 GHz, such as Bluetooth®. Optionally, the PAN may be a network that is not capable of being boosted or repeated, which can be implemented to better ensure that the local verification for the mobile device 120 is accurate. The so-called local wireless communication network may be referred to herein as a second wireless communication network 144. Local may also mean that a wireless communication connection, such as Bluetooth®, has not been extended by an extender.

Remote, as used herein, can mean not local. For instance, remote can mean that each of the mobile device 120 and the machine 110 is within a specific wireless communication range (or ranges) of the back office system 130 based on specific wireless communication protocol (or protocols), wireless communication network, and wireless communication circuitry of the mobile device 120 and the back office system 130, but not within a specific lesser communication range of the back office system 130. Thus, the machine 110 can be remote from the back office system 130. The back office system 130 can also be considered remote from the mobile device 120, depending upon the location of the mobile device 120, for instance. Remote may also mean that a wireless communication connection, such as Bluetooth®, has been extended by an extender.

The communication network between the machine 110 and the back office system 130 may be referred to herein as a first communication network 142, and the communication network between the mobile device 120 and the back office system 130 may be referred to herein as a third communication network 146. In this regard, the first communication network 142 and/or the third communication network 146 can embody any network that provides two-way communication between and/or among one or more facilities, computer systems, and/or servers, such as between the machine 110 and the back office system 130 and between the mobile device 120 and the back office system 130, respectively.

The first communication network 142 and/or the third communication network 146 can be wireless communication networks. For instance, the first wireless communication network 142 and/or the third wireless communication network 146 can be broadband-based, such as cellular-and/or local area network (LAN)-based (e.g., Wifi or customer router). In this regard, the first wireless communication network 142 and/or the third wireless communication network 146 can implement or be implemented via NMT, GSM, LET, or 5G and corresponding platforms and access.

Optionally, the first communication network 142 and the third communication network 146 can be the same type of network and/or use the same communications protocol (e.g., same wireless communication protocol). According to one or more embodiments, the first communication network 142 and/or the third communication network 146 can include Internet access and hence the Internet. The first communication network 142 and/or the third communication network 146 may include one or more devices and subsystems adapted to support a cellular communication network, such as one or more cellular communication towers and/or antennae, and wired or wireless networking components (e.g., wireless or wireline switches, hubs, multiplexers, demultiplexers, etc.) that support the cellular communication network.

The first communication network 142 can provide streaming, real-time, bandwidth-optimized, and secure data, including operational data, from the machine 110 to the back office system 130. Thus, for example, the first communication network 142 can upload data (including operational data) from the machine 110 to the back office system 130. That is, data (including operational data) can be uploaded to the back office system 130 via the first communication network 142 and/or the back office system 130 can gain access to the data of the machine 110 via the first communication network 142.

The machine 110 can include onboard system 115 for communication with onboard components of the machine 110 and offboard components, such as the mobile device 120 and the back office system 130. For instance, the onboard system 115 can provide operational data of the machine 110 (e.g., upload or allow access to) to offboard components, such as the mobile device 120 and the back office system 130, and, optionally to onboard components of the machine 110. The onboard system 115 can also monitor and collect operational data of the machine 110. Access to the operational data may include reading and/or writing of select operational data by and/or distribution of operational data to offboard components, such as the mobile device 120 and the back office system 130.

Operational data, as the term is used herein, can refer to any type of data indicative of at least one operational aspect associated with the machine 110 or any of its constituent components or subsystems. Operational data can include information pertaining to health, productivity, status, settings, control signaling, parameters, operating conditions, and/or performance of one or more components of the machine 110 and/or of the machine 110 as a whole. Generally, access to or distribution of the operational data can be via the back office system 130 by way of the first communication network 142 and via the mobile device 120 by way of the back office system 130 and the third communication network 146.

The onboard system 115 can be comprised of a controller 117 (or a distributed group of controllers), one or more communication components 118, and one or more monitoring devices 119. Generally, data from the monitoring devices 119 can be sent to the controller 117 and saved in memory (not expressly shown in FIG. 1) that is accessible by the controller 117 and/or passed on to one or more offboard components, such as the back office system 130 and the mobile device 120. Optionally, the controller 117 may process the data prior to providing (or providing access to) the data to other components, onboard and/or offboard. The controller 117 or the controller 117 and one or more of the communication components 118 may be referred to herein as a communication entity or a first communication entity. Put another way, a communication entity of the machine 110 may be comprised of the controller 117 and one or more of the communication components 118.

Monitoring devices 119 may include any device for collecting operation data associated with the machine 110. For example, monitoring devices 119 may include one or more sensors to measure an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; haul grade and traction data; drive axle torque; intervals between scheduled or performed maintenance and/or repair operations; and any other operational parameter of machine 110.

Focusing on FIG. 2, the controller 117 can, as noted above, have components to receive data from monitoring devices 119, process and machine-related data (including operational data), and allow access to or otherwise output such data for use by onboard and offboard components, such as the back office system 130 and the mobile device 120. More specifically regarding access to the data, according to one or more embodiments, the controller 117 can have or implement a network manager component 217. According to one or more embodiments, the controller 117 can package monitored operational data for transmission to the back office system 130.

The network manager 217 can have or implement a processor (or processing circuitry) 220 that provides electronic service logic, such as data link logic, feature logic, and memory (e.g., databases, flash memory, etc.). Such components can be operatively provided to establish and control network connections and facilitate communication with other components or systems via respective networks, such as the back office system 130 and the mobile device 120 via the first communication network 142 and the second communication network 144, respectively. For instance, the ET database can collect and store status parameters, configuration parameters, diagnostic codes, disassembly/assembly instructions, etc., and ET server can provide data from (or access to) the ET database to the back office system 130 via the first communication network 142.

The network manager 217 can also provide a communication interface with the communication components 118 via a dedicated data link 1180, such as J1939 or CDL. Incidentally, the communication components 118 can be one or more components that provide onboard cellular radio, Wi-Fi radio, and/or customer routing communication to offboard systems, such as back office system 130.

The network manager 217 can establish and communicate over a first network interface 222 to the back office system 130 (via the first communication network 142). Likewise, the network manager 217 can establish and communicate over a second network interface 224 to the mobile device 120 (via the second communication network 144). Discussed in more detail below, the mobile device 120 and the controller 117 can communicate with each other (e.g., transmit, receive, provide access to data) by way of the back office system 130.

The back office system 130 can have a remote services component 132 and a telematics component or module 136 operatively coupled to each other. Each of the remote services component 132 and the telematics component 136 can be implemented by a server or group of servers (e.g., via the cloud).

The remote services component 132, which may be operatively coupled to the telematics component 136, can provide memory (e.g., an ET database), a data aggregator, graphical user interface (GUI) logic, and a digital stewardship platform (DSP). The remote services component 132 can also provide online (i.e., web) access to electronic technician (ET) services, such as access to troubleshooting manuals, listings of codes, listings of parameters, etc. According to one or more embodiments, the remote services component 132 can provide (e.g., serve) can provide content (e.g., machine operational data and/or web content (e.g., manuals) to the mobile device 120.

The telematics component 136, which may be operatively coupled to the remote services component 132, can provide capabilities including MQs (i.e., messaging over message server according to MQ Telemetry Transport (MQTT)), an ED, and a common data service (CDS). The telematics component 136 can also provide a gateway (e.g., priority Queue) between the back office system 130 and the machine 110. Generally, the telematics component 136 can integrate telematics data (e.g., operating hours, location, fuel consumed, odometer, etc.) for one or more machines, such as machine 110.

The telematics component 136 can establish a network interface 137 and communicate with the network manager 217 via the network interface 137 (via the first communication network 142). Likewise, the remote services component 132 can establish a network interface 133 and communicate with the mobile device 120 via the network interface 133 (via the third communication network 146).

The mobile device 120, which may be operated by a technician 10, can be a tablet, PDA, or some other hand-held portable device. The mobile device 120 may be referred to herein as a mobile servicing or troubleshooting device 120, because the mobile device 120 can be used by a technician 10 to service (e.g., diagnose, troubleshoot, service) one or more machines, such as machine 110. Discussed in more detail below, such troubleshooting may be wireless and local relative to the machine 110.

The mobile device 120 can include a controller or control circuitry 122, an operator interface 124, and a communication component (or circuitry) 126. The operator interface 124 and the communication component 126 can be operatively coupled to the controller 122, which may be comprised of one or more processors and corresponding memory.

The controller 122 can run a thin mobile application. As used herein, a thin mobile application can mean an application that executes a relatively small amount of code on the mobile device 120 and relies on an outside server or hardware component, particularly the back office system 130, for much of its functionality and code based maintenance. Discussed in more detail below, the thin mobile application can assist in wirelessly pairing the mobile device 120, particularly the communication component 126, with the machine 110, particularly the network manager 217 thereof. The thin mobile application can also render an operator interface to receive inputs from the technician 10 and output information to the technician 10. According to one or more embodiments, the thin mobile application can provide an in-application web browser for accessing webpages over the Internet (via the back office system 130). Accessing webpages may result in additional content being displayed on the mobile device 120, such as servicing data in the form of a manual (e.g., servicing or troubleshooting manual), parts lists, inventory, part lead time, estimated service life, etc. According to one or more embodiments, the additional content may be content from the back office system 130 that is related to the servicing of the machine 110 but not directly derived from the data from the machine 110 received at the back office system 110.

The operator interface 124 can receive inputs from the technician 10 and output information to the technician 10. For instance, the operator interface 124 may have a graphical user interface (GUI) on a display device to receive inputs from the technician 10 to communicate with the machine 110 and the back office system 130. The operator interface 124 may also display or otherwise output data (including machine operational data) received from the back office system 130. According to one or more embodiments, the operator interface 124 may display or otherwise output data directly from the machine 110, for instance, to establish and maintain a local wireless connection. As noted above, the operator interface 124, at least in part, can be rendered by the thin mobile application running on the mobile device 120. Also noted above, the operator interface 124 can provide an in-application web browser, via the thin mobile application, to access webpages over the Internet (via the back office system 130).

The communication component 126 can establish a network interface 123 and communicate with the back office system 130 via the third communication network 146. The communication component 126 can also establish, in conjunction with the thin mobile application running on the mobile device 120, a communication interface 127 to communicate directly with the machine 110 via the second communication network 144.

INDUSTRIAL APPLICABILITY

As noted above, the present disclosure relates to providing local servicing, and more particularly to enable local service functionality to a mobile device to locally service machines.

According to embodiments of the disclosed subject matter, a servicing (e.g., diagnostics, updating, troubleshooting) system can include both a mobile device and one or more communication components of a machine connected (e.g., wirelessly) to a remote back office system independently of each other. As noted above, the mobile device may be referred to herein as a mobile servicing or troubleshooting device. The arrangement can also be such that the mobile device establishes a local wireless connection with the machine via a specific Personal Area Network (e.g., that uses short-wavelength UHF radio waves from 2.400 GHz to 2.485 GHz, such as Bluetooth®). The local wireless connection between the mobile device and the machine can be to verify that the mobile device is local to the machine.

The verification that the mobile device is local to the machine, i.e., proximity verification, may also include authorization protocols, and can be enabled by a thin mobile application running on the mobile device. Such authorization can include encryption operations, for instance, to verity that the local network is not based on an extended connection (e.g., a Bluetooth® connection that has been range-extended).

Once the mobile device has been verified as being local to the machine, the mobile device can be enabled with local servicing functionality to perform operations to the machine, such as troubleshooting, diagnostics, servicing, etc. That is, once the mobile device has been verified as being local to the machine, select restrictions on what servicing functionality the mobile device has relative to the machine can be removed. Put another way, the mobile device may not have access to servicing functions having elevated privileges. Such elevated-privilege servicing functions can include: writing configuration parameters, resetting parameters, overriding outputs, performing calibrations, diagnostic tests, and/or diagnostic procedures.

Verifying that the mobile device is local to the machine can ensure that the technician operating the mobile device has situational awareness, the ability to react to changes, etc. This way, the technician local to the machine can use the mobile device to perform the servicing to the machine directly (e.g., diagnostics, troubleshooting, writing parameters, etc.), rather than having to rely upon a technician located remotely to perform servicing, particularly where the remote technician may have intentionally restricted servicing capabilities due to a lack of situational awareness, the ability to react to local changes, etc. that may be otherwise available if local to the machine. For instance, a remote technician may be restricted from changing machine thresholds, operational modes, speed limits, etc.

Such arrangement may also facilitate access for the mobile device regarding local service functionality, because the mobile device can already be set up beforehand for local servicing functionality (e.g., as or under a subscriber, according to web security, using a passcode input by the technician at the mobile device) upon verification that the mobile device is local to the machine rather than a technician located locally relative to the machine still having to communicate and coordinate with the technician located remotely. According to one or more embodiments, if the technician is next to the machine within the range of the PAN of the machine, the mobile device can automatically connect to the machine, for instance, upon entry of a passcode at the mobile device prior to or during the connection process.

According to embodiments of the disclosed subject matter, the mobile device can be connected directly (e.g., wirelessly) to the back office system, rather than via the one or more communication components that also can be connected directly (e.g., wirelessly) to the back office system. Thus, the mobile device can be connected directly to the machine and connected directly the back office system, via different networks, and without the network over which the machine is directly connected to the back office system. This can preclude the need for the mobile device to be connected to the machine via a wired connection for servicing operations. A wireless adaptor on the machine also may not be needed.

Such arrangement can also allow the mobile device, when wirelessly connected to the machine and verified to be local to the machine, to provide local servicing capabilities for the machine while also being able to simultaneously access the Internet (via the direct wireless connection to the back office system). As noted above, local servicing capabilities that require elevated privileges may include writing configuration parameters, resetting parameters, overriding outputs, performing calibrations, diagnostic tests, and/or diagnostic procedures.

The thin mobile application running on the mobile device can provide a web browser to access websites separately from the local servicing capabilities also provided by the thin mobile application. Thus, the mobile device may not try to connect directly to the machine thinking that the machine is the way to gain access to the Internet. The thin mobile application may also be operating system (OS) agnostic, meaning that the thin mobile application may be run on mobile devices with different operating systems.

Figure 3:
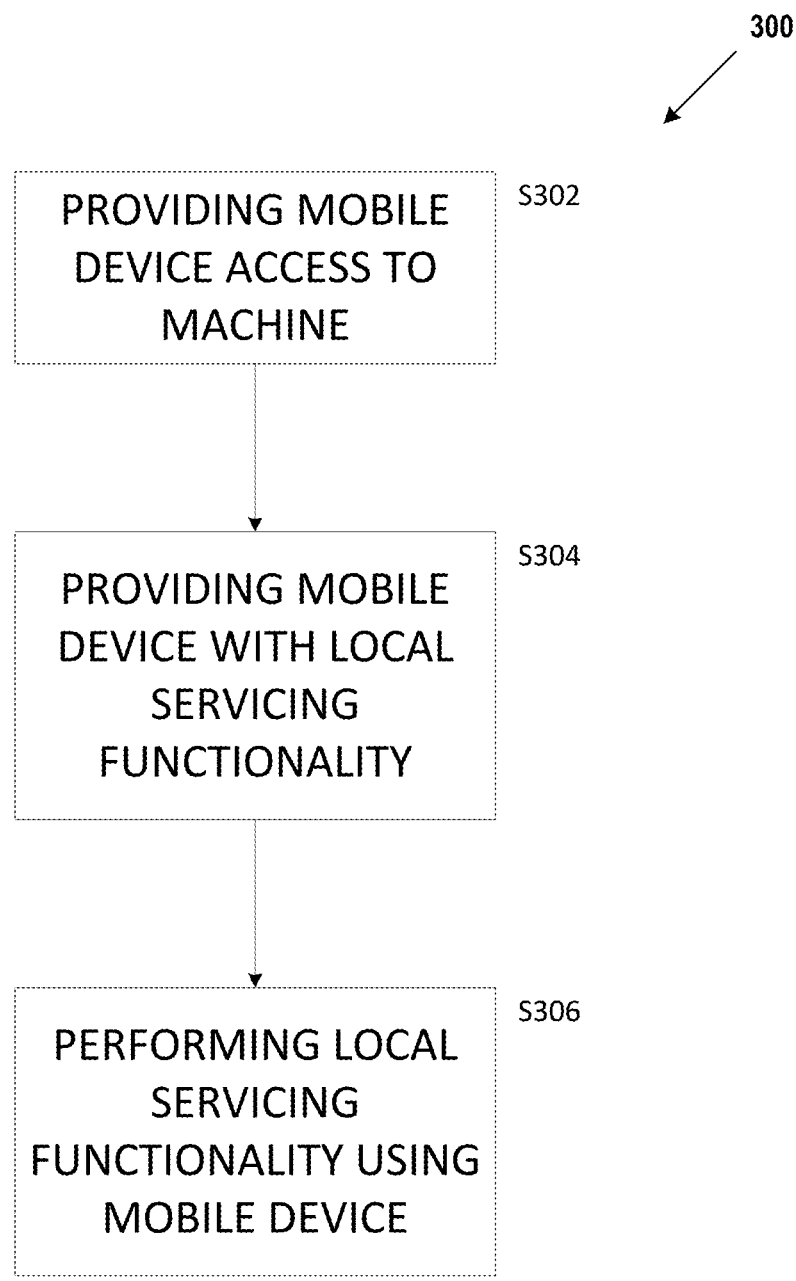
FIG. 3 is a flow chart for a method according to one or more embodiments of the disclosed subject matter.

Turning to FIG. 3, FIG. 3 is a flow chart for a method 300 according to one or more embodiments of the disclosed subject matter.

Generally, the method 300 can be characterized as a method for providing local servicing functionality to a mobile device, such as mobile device 120, so the mobile device 120 can be used to provide local servicing (e.g., troubleshooting, diagnostics, servicing, etc.) to a machine, such as machine 110. The method 300 can be implemented by systems according to embodiments of the disclosed subject matter, such as system 100. Thus, the method 300, or portions thereof, can be implemented using a non-transitory computer-readable storage medium (or different media spread across the machine 110, the mobile device 120, and the back office system 130) storing computer-readable instructions that, when executed by one or more computers (again, including of the machine 110, the mobile device 120, and the back office system 130), cause the one or more computers to perform the method 300, or portions thereof as the case may be.

At S302 the method 300 can including providing, to the mobile device 120, access to a network manager, such as network manager 217, of the machine 110. Such access can include a pairing process between the network manager 217 and the mobile device 120, over a wireless communication network, such as wireless communication network 144, which may be a Personal Area Network (PAN). Discussed in more detail with respect to FIG. 4, the providing access of S302 can also include the mobile device 120 searching for one or more network managers of respective one or more machines 110, the mobile device 120 receiving machine-related information, such as a device name, type, and/or serial number from each of the one or more network managers, and pairing the mobile device 120 with one of the network managers of one of the machines responsive to a selection of the one machine by a technician 10 operating the mobile device 120. The pairing process may involve encryption, for instance, to prevent use of a connection that has been extended (e.g., a Bluetooth® connection that has been extended using a range extender).

Upon successful pairing, at S304 the method 300 can include providing (e.g., enabling) local servicing functionality on the mobile device 120 so the mobile device 120 can perform local servicing of the machine 110 (i.e., the paired machine). Discussed in more detail below with respect to FIG. 4, the enabling can include the mobile device 120 connecting to the machine 110 via a remote system, such as back office system 130. According to one or more embodiments, the back office system 130 can authorize the connection prior to the pairing and/or as part of the providing at S304. The authorization prior to the pairing can include defining rights (e.g., elevated access rights) to the technician or an operator of the mobile device 120. Such rights can be associated with a user of the machine 110, a subscriber associated with the mobile device 120, a subscriber associated with the technician 10, such as an employer of the technician 10, and/or a subscriber identification associated with the machine, the subscriber associated with the mobile device, or the subscriber associated with the technician 10.

Without the pairing and connection between the mobile device 120 and the machine 110, the mobile device 120 can be prohibited from performing local servicing functions. However, according to one or more embodiments, when the mobile device 120 and the machine 110 are not paired and connected according to local connectivity requirements for enabling local servicing functionality, the mobile device 120 may still be enabled with remote or non-local servicing functionality, which can be more restrictive than the local service functionality. Remote or non-local servicing functionality may not require elevated privileges.

With the mobile device 120 and the machine 110 paired and connected, at S306, the method 300 can include performing local servicing operations using the mobile device 120. The local servicing operations can be performed using a thin mobile application running on the mobile device 120 and based on inputs to the mobile device 120 from the technician 10.

Performing local servicing operations can include communicating servicing data, such as troubleshooting data, between the network manager 217 and the back office system 130 via a communication network, such as the first communication network 142. The performing the local servicing operations can also include communicating servicing data, such as troubleshooting data, between the network, manager 217 and the mobile device 120, via a communication network, such as the third communication network 146. Such servicing data may not be transmitted from the network manager 217 to the mobile device 120 directly via the second communication network 144. According to one or more embodiments, the local servicing can include writing data (e.g., setting configuration parameters), using the mobile device 120, to the network manager 217 and/or other components of the machine 110, such as the controller 117 or an associated memory thereof. For example, local servicing may include writing configuration parameters, resetting parameters, overriding outputs, performing calibrations, diagnostic tests, and/or diagnostic procedures.

The local servicing operations of S306 can also include accessing web content using the thin mobile application running on the mobile device 120, over the third network 146 in the form of the Internet. That is, the mobile device 120 can access web content while still being locally paired and connected to the network manager 217 of the machine 110.

Figure 4:
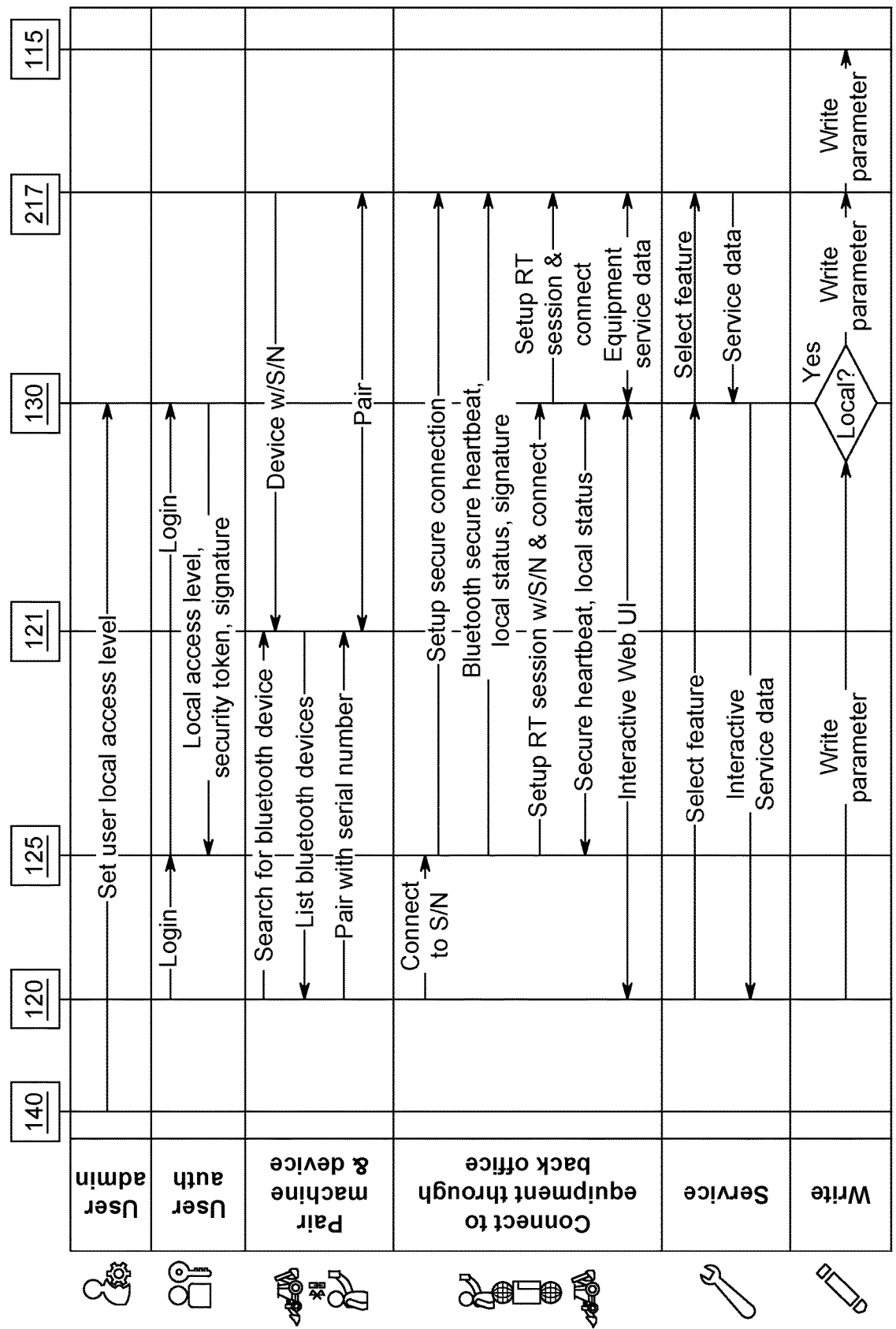
FIG. 4 is a servicing sequence diagram according to one or more embodiments of the disclosed subject matter.

FIG. 4 is a servicing sequence diagram according to one or more embodiments of the disclosed subject matter. The sequence diagram can represent an exemplary sequence of events to provide local servicing functionality to a mobile device, such as mobile device 120, so the mobile device 120 can be used to provide local servicing (e.g., troubleshooting, diagnostics, servicing, etc.) to a machine, such as machine 110.

Initially, a local access level can be set for an operator, such as technician 10. The local access level can be set specific for a particular technician or another subscriber, such as the owner of the machine 110 and/or the owner of the mobile device 120. The local access level setting can include an owner or administrator 140 of the local service functionality methodology and processing (including software, such as a thin mobile application running on the mobile device 120) setting the local access level and sending such information to the back office system 130 for storage, for instance, by the remote services component 132.

The sequence may next involve a login procedure at the mobile device 120. The login procedure can involve, for instance, entry of an identifier and passcode at the mobile device 120 by a technician or an owner of the mobile device 120. The log in information can get passed and processed by the thin mobile application 125 running on the mobile device 120, and then transmitted from the mobile device 120 to the back office system 130. In response, the back office system 130, for instance, the remote services component 132 thereof, can retrieve the previously stored local access level associated with the log in information and send authorization information to the mobile device 120 via the thin mobile application 125. The authorization information can include the local access level, a security token, and a digital signature, for instance, from the owner or administrator 140.

The sequence may next involve a pairing process, whereby the mobile device 120 and machine 110 can be paired when the mobile device 120 is local to the machine 110. The pairing process can involve searching for devices outputting local wireless communication signals over a specific personal area network (PAN), such as Bluetooth®, as a non-limiting example, under control of the operating system (OS) 121 of the mobile device 120. Each machine, including the machine 110, can send from their network manager 217 device information, such as device name, type, and serial number. Thus, depending upon the number of machines having transmission distances for their PAN communication components within range of the mobile device 120, the mobile device 120 can produce a list of candidate machines for selection. The technician 10, via the mobile device 120, can select one of the listed machines to pair the mobile device 120 with the selected machine 110.

The pairing processing can involve network-specific pairing and authentication between the mobile device 120 and the network manager 217 of the machine 110. Optionally, the mobile device 120 may be paired with only one machine at a time. Alternatively, the mobile device 120 may be paired at the same time with multiple machines within the transmission capabilities of the machines and the mobile device 120. Optionally, the pairing process may involve encryption, for instance, to prevent use of a connection that has been extended (e.g., a Bluetooth® connection that has been extended using a range extender).

Once the mobile device 120 is paired with the machine 110, the sequence may proceed to a connection process. According to one or more embodiments, the mobile device 120 may be connected to only one machine 110 at a time. However, in other embodiments of the disclosed subject matter, the mobile device 120 may be paired continuously or intermittently with multiple machines at one time.

The connection process can include the setup and establishment of a secure connection between the mobile device 120 and the machine 110, and can be initiated by the technician 10 inputting a connect command for a particular machine using the mobile device 120. According to one or more embodiments, the connect command can be generated responsive to an input to the operator interface 124 of the mobile device 120.

FIG. 4 shows exemplary processing, including setup secure connection processing between the thin application program 125 and the network manager 217, secure heartbeat, local status, and digital signature processing between the thin application program 125 and the network manager 217, real time (RT) session setup and connect processing between the thin application program 125 and the back office system 130, RT session setup and connect processing between the back office system 130 and the network manager 217, providing an interactive web user interface (UI) by the back office system 130 to the mobile device 120, and providing machine data, such as machine operational data from the network manager 217 to the back office system 130 to access using the mobile device 120.

Once the mobile device 120 is connected to the machine 110, the technician 10 can perform local servicing using the mobile device 120. According to one or more embodiments, as shown in FIG. 4, the technician 10 can use the mobile device 120 to select a particular servicing feature associated with the machine 110. Such process can involve sending the selection information from the mobile device 120 to the network manager 217 via the back office system 130. The network manger 217, in turn, can provide access (e.g., transmit to) to data, such as operational data, associated with the particular servicing feature, to the mobile device 120 via the back office system 130.

The provided data may be interactive data in the sense that the data can be modified by the technician 10 using the mobile device 120. For instance, the technician 10 may provide inputs to the mobile device 120 to write data, such as machine parameter data, to the machine 110. According to one or more embodiments, in the event that the mobile device 120 outputs comments to modify the data of the machine 110, such as writing parameter data, the back office system 130 may verify that the mobile device 120 is still local to the machine 110 and that the subscriber associated with mobile device 120 has rights to write parameter data, before the writing is actually allowed. Local can mean that the mobile device 120 is paired and connected to the machine 110 as discussed above. Upon verification, the local servicing can be performed (e.g., local servicing may include writing configuration parameters, resetting parameters, overriding outputs, performing calibrations, diagnostic tests, and/or diagnostic procedures). For instance, as shown in FIG. 4, a parameter or parameters may be written to via the network manager 217 as described above and then to the onboard system 115 or a component thereof, such as the controller 117.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system for locally troubleshooting a working machine comprising:
   a first communication entity provided onboard the working machine, the first communication entity including a network manager;
   a back office system remote from the working machine;
   a mobile device hosting a thin client application to troubleshoot the working machine locally upon gaining access to the network manager;
   a first communication network accessible by the back office system and the first communication entity for the first communication entity to communicate with the back office system;
   a second communication network, different from the first communication network, accessible by the mobile device and the network manager for the mobile device to gain access to the network manager; and a third communication network, different from the first communication network and the second communication network, accessible by the mobile device and the back office system for the mobile device and the back office system to communicate with each other, wherein the second communication network is a personal area network, and the thin client application gains access to the network manager only when the mobile device is local to the network manager and within a transmission distance of the personal area network, and wherein the mobile device and the network manager communicate troubleshooting data with each other only through the back office system via the first communication network and the third communication network and not through the second communication network when the thin client application has access to the network manager via the second communication network.

2. The system according to claim 1, wherein the mobile device accesses media over the Internet as the third communication network via the back office system using the thin client application at the same time as having access to the network manager via the second communication network.

3. The system according to claim 1, wherein the mobile device, responsive to an input from a technician operating the mobile device, writes troubleshooting data to one or more controllers of the working machine using the network manager.

4. The system according to claim 1, wherein the mobile device gains access to local troubleshooting capabilities to troubleshoot the working machine according to rights granted to a subscriber associated with the working machine and the mobile device with access to the network manager.

5. The system according to claim 1, wherein the second communication network is a wireless communication network that uses short-wavelength UHF radio waves from 2.400 GHz to 2.485 GHz.

6. The system according to claim 1, wherein the mobile device is prohibited from writing data to the network manager, through the back office system via the first communication network and the third communication network, when the thin client application has not gained access or has lost access to the network manager via the second communication network, and wherein the mobile device is authorized to read data from the network manager, through the back office system via the first communication network and the third communication network, when the thin client application has not gained access or has lost access to the network manager via the second communication network.

7. The system according to claim 1, wherein the mobile device, without access to the network manager via the second communication network, has restricted troubleshooting capabilities to troubleshoot the working machine according to rights granted to a subscriber associated with the working machine and the mobile device.

8. The system according to claim 1, wherein the working machine is a mobile vehicle at a construction site or a mine site.

9. A method comprising:

providing, to a mobile troubleshooting device, access to a network manager of a machine via a pairing process between the network manager and the mobile troubleshooting device over a personal area network;

enabling, from a back office system, local troubleshooting functionality on the mobile troubleshooting device upon successful pairing and connection between the network manager and the mobile troubleshooting device over the personal area network; and with the mobile troubleshooting device and the network manager paired and connected, performing local troubleshooting operations responsive to operator inputs at the mobile troubleshooting device, wherein said performing local troubleshooting operations includes communicating troubleshooting data between the back office system and the network manager via a first wireless communication network and between the back office system and the mobile troubleshooting device via a third wireless communication network without the troubleshooting data being communicated between the network manager and the mobile troubleshooting device via the personal area network, wherein the personal area network is different from the first wireless communication network and the third wireless communication network, and wherein the first wireless communication network is different from the third wireless communication network.

10. The method according to claim 9, wherein each of the first wireless communication network and the third wireless communication network is the Internet.

11. The method according to claim 9, further comprising accessing web content over the Internet via the back office system using an application running on the mobile troubleshooting device with the mobile troubleshooting device and the network manager paired and connected.

12. The method according to claim 9, wherein the local troubleshooting functionality for the mobile troubleshooting device is defined according to rights granted to a subscriber associated with the machine and the mobile troubleshooting device.

13. The method according to claim 9, further comprising prohibiting some or all of the local troubleshooting operations when the mobile troubleshooting device and the network manager are unconnected.

14. The method according to claim 9, wherein the personal area network uses short-wavelength UHF radio waves from 2.400 GHz to 2.485 GHz.

15. The method according to claim 9, further comprising providing restricted troubleshooting functionality relative to the local troubleshooting functionality for the mobile troubleshooting device when the mobile troubleshooting device and the network manager are unconnected.

16. A non-transitory computer-readable storage medium storing computer-readable instructions that, when executed by one or more computers, cause the one or more computers to perform a method comprising:

providing access to a network manager on or in a machine, for a mobile device having at least one of the one or more computers, via a pairing and connection process between the network manager and the mobile device over a short-wavelength, UHF radio wave wireless network; and providing local troubleshooting functionality at the mobile device to perform local troubleshooting operations upon the mobile device having access to the network manager, wherein the local troubleshooting functionality for the mobile device is defined according to rights granted to a subscriber authorized to access the network manager, and wherein the local troubleshooting functionality for the mobile device provides for communication of troubleshooting data indirectly from the mobile device to the network manager via a first wireless communication network and a third wireless communication network different from each other and from the short-wavelength, UHF radio wave wireless network, without the troubleshooting data traveling over the short-wavelength, UHF radio wave wireless network.

17. The non-transitory computer-readable storage medium according to claim 16, wherein said providing local troubleshooting functionality at the mobile device is authorized by a back office system that communicates with the mobile device via the third wireless communication network.

18. The non-transitory computer-readable storage medium according to claim 16, wherein the method further comprises performing local troubleshooting operations responsive to one or more inputs to the mobile device, said performing local troubleshooting including writing data, responsive to the one or more inputs at the mobile device, from the mobile device to the network manager via a back office system over the third wireless communication network and the first wireless communication network.

19. The non-transitory computer-readable storage medium according to claim 16, wherein the method further comprises accessing web content over the third wireless communication network via a back office system with the mobile device and the network manager paired and connected.

20. The non-transitory computer-readable storage medium according to claim 16, wherein the local troubleshooting functionality of the mobile device is disabled in favor of remote troubleshooting functionality when the mobile device and the network manager are unconnected.

* * * * *